May 15, 1923.
F. ADAM ET AL
MEAT SLICING MACHINE
Filed Oct. 6, 1922   5 Sheets-Sheet 1
1,455,699
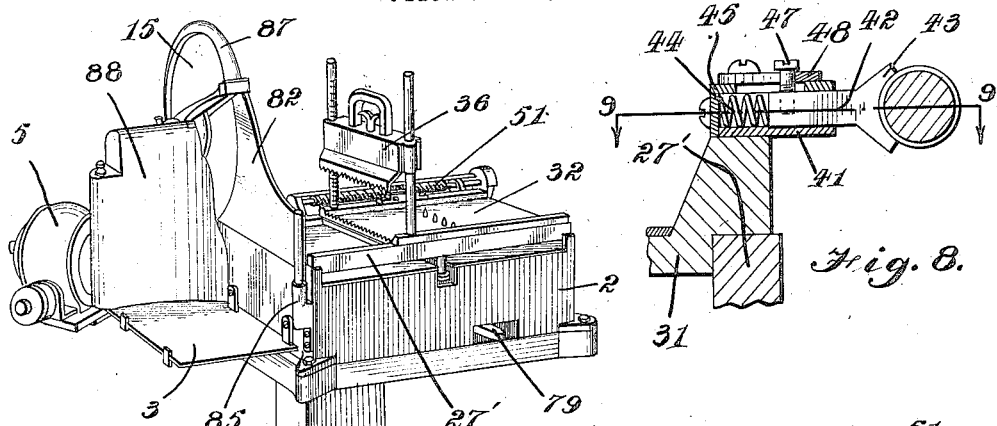
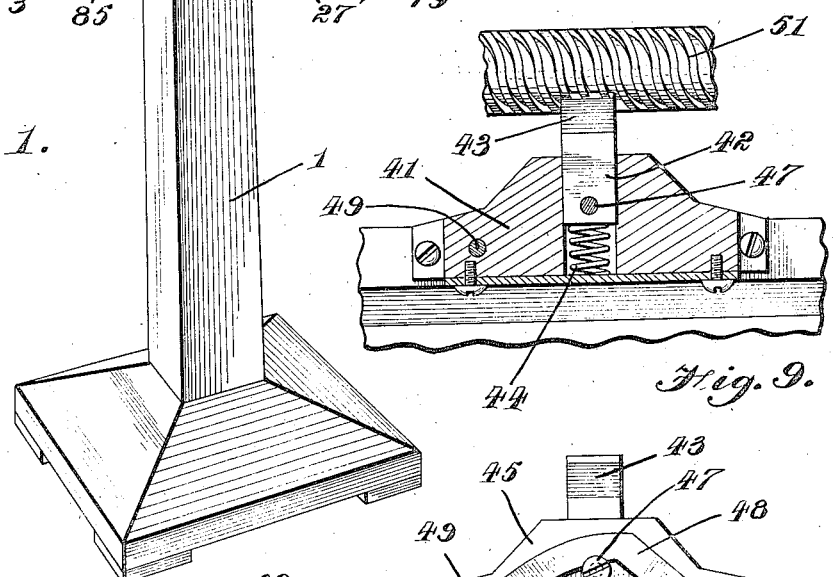
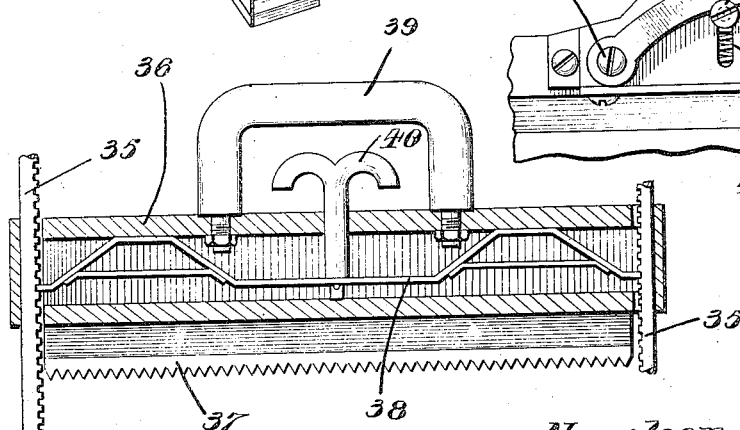
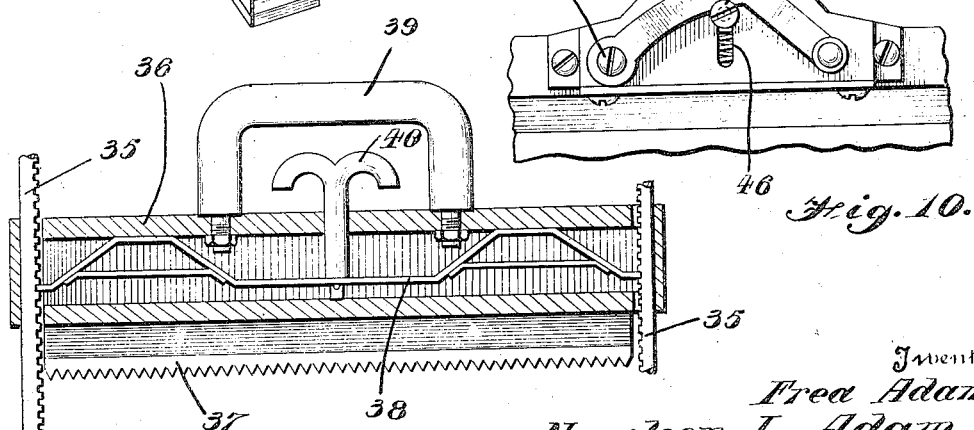
Inventors
Fred Adam
Napoleon L. Adam
By William C. Sinton
Attorney

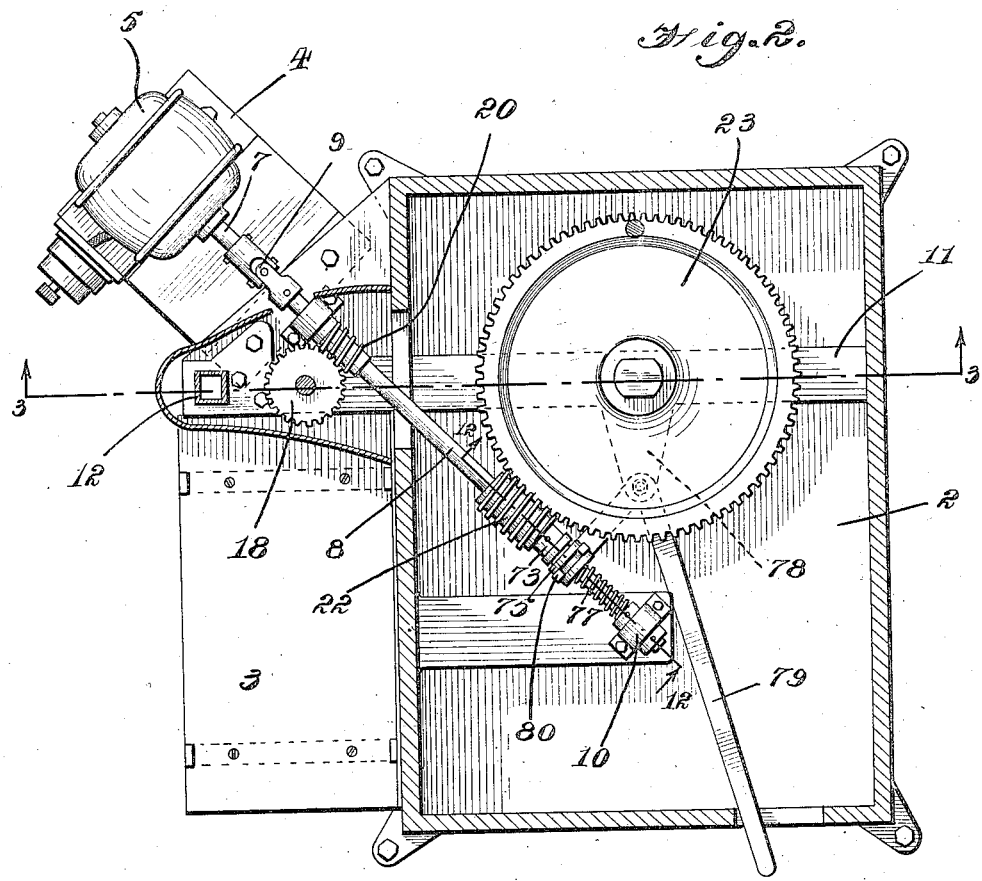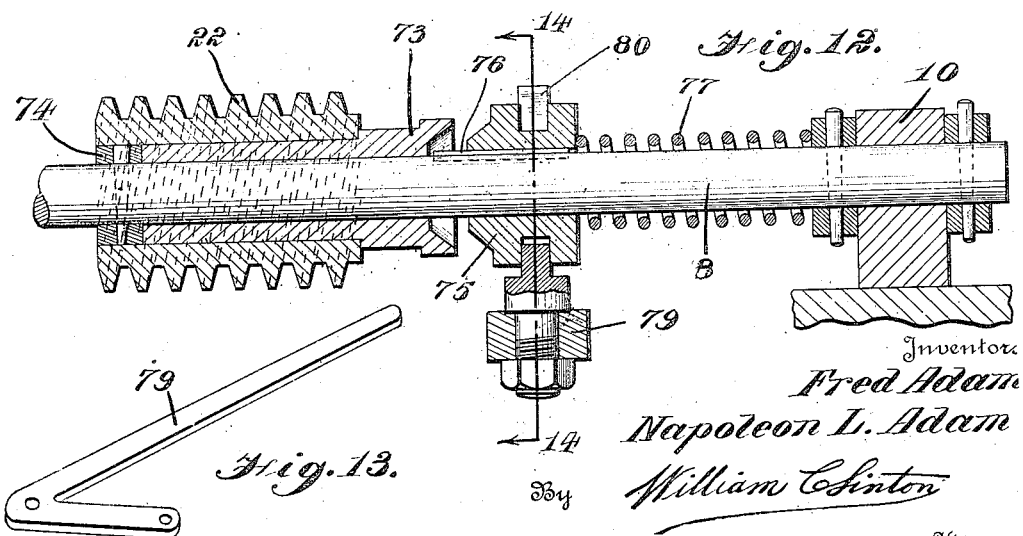

May 15, 1923.
F. ADAM ET AL
MEAT SLICING MACHINE
Filed Oct. 6, 1922
1,455,699
5 Sheets-Sheet 3
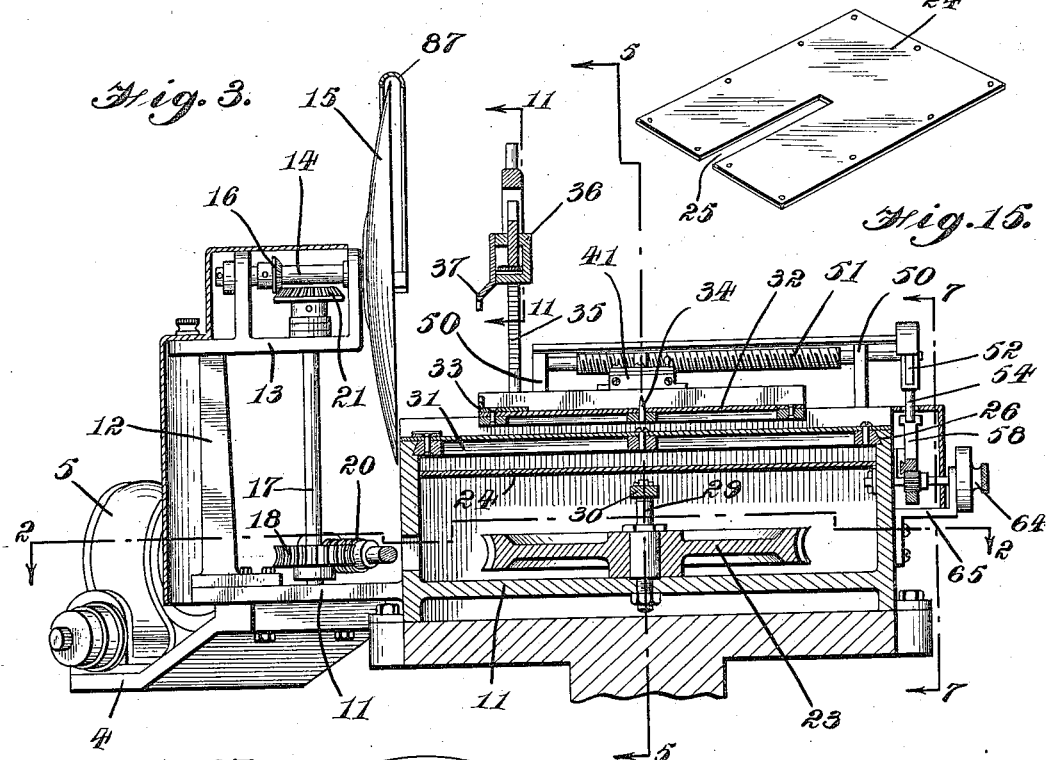
Fig. 3.
Fig. 15.
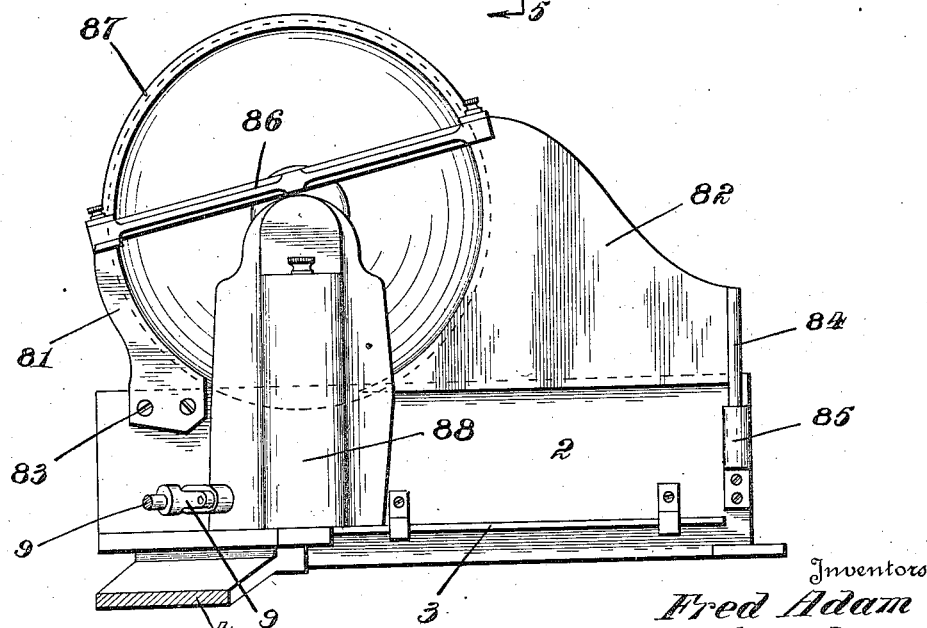
Fig. 4.
Inventors
Fred Adam
Napoleon L. Adam
By William C. Sinton
Attorney May 15, 1923.
F. ADAM ET AL
MEAT SLICING MACHINE
Filed Oct. 6, 1922      5 Sheets-Sheet 4
1,455,699
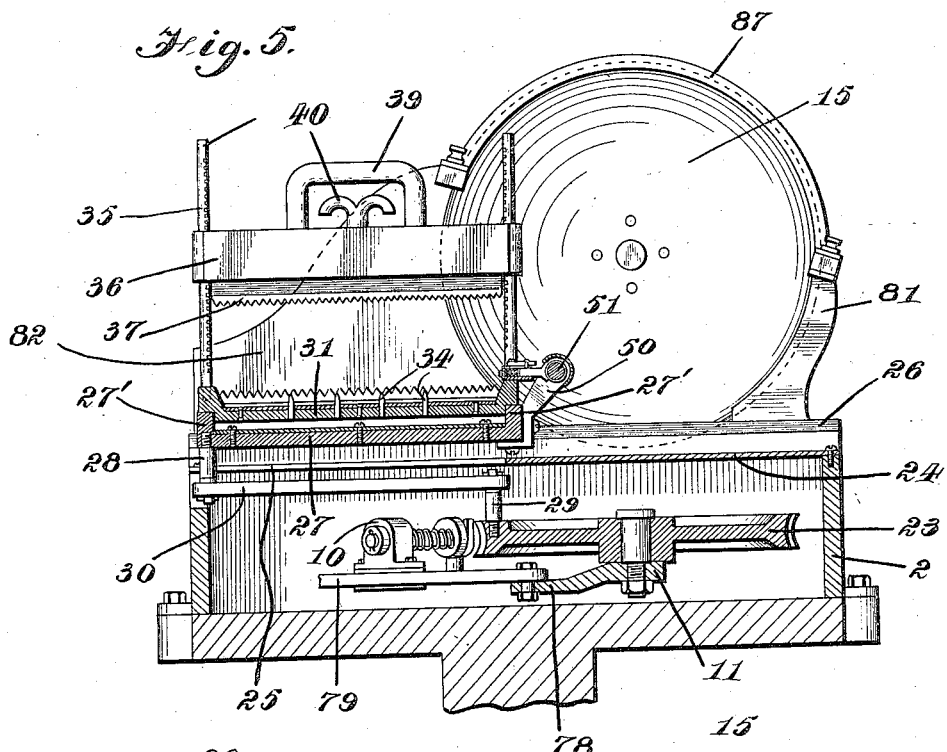
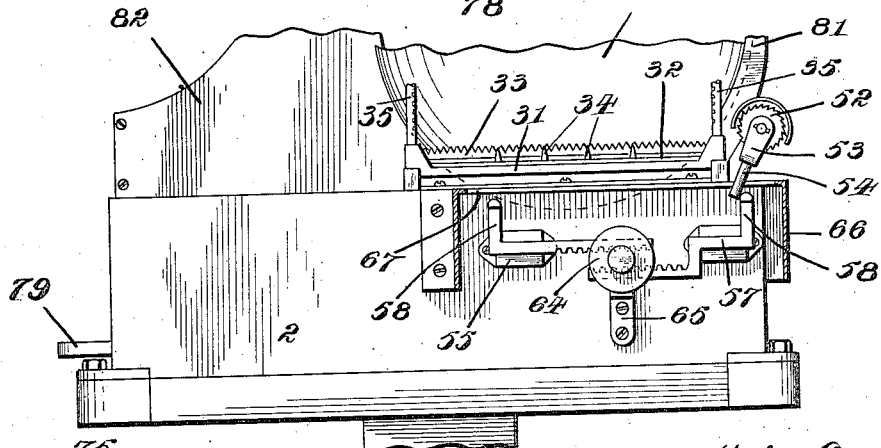
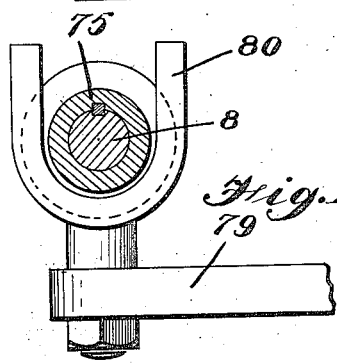
Inventors
Fred Adam
Napoleon L. Adam
By William C. Sinton
Attorney

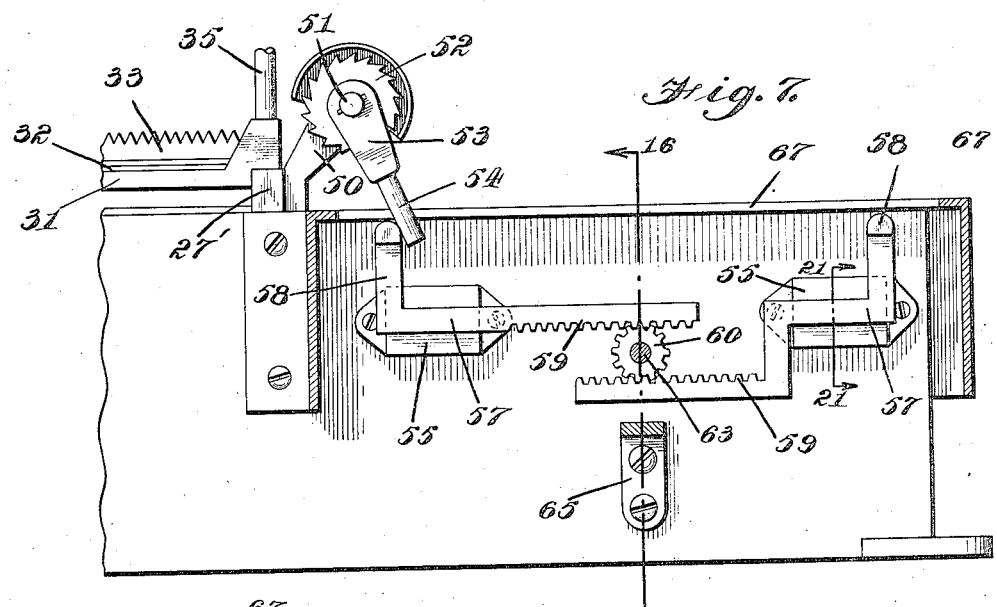
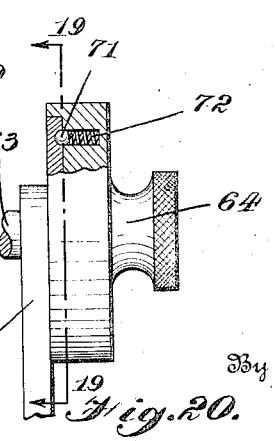
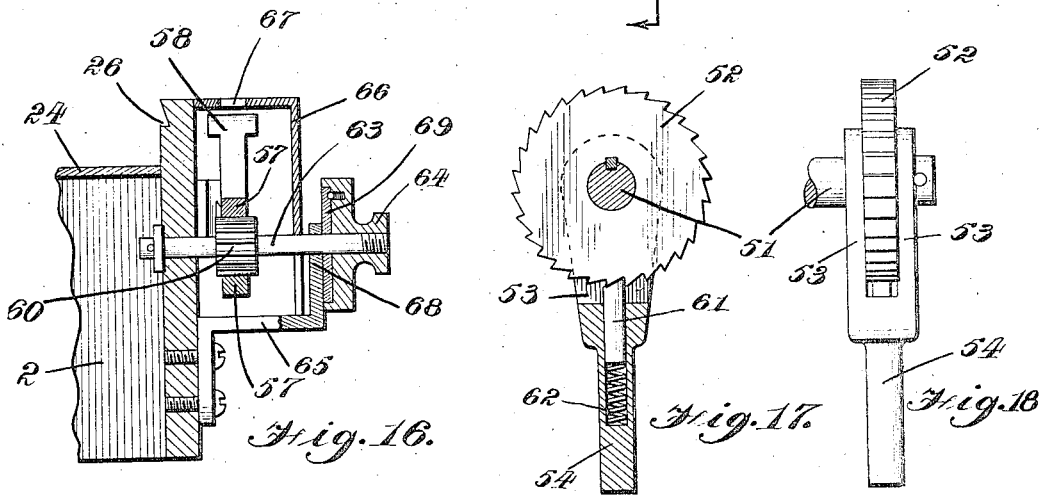
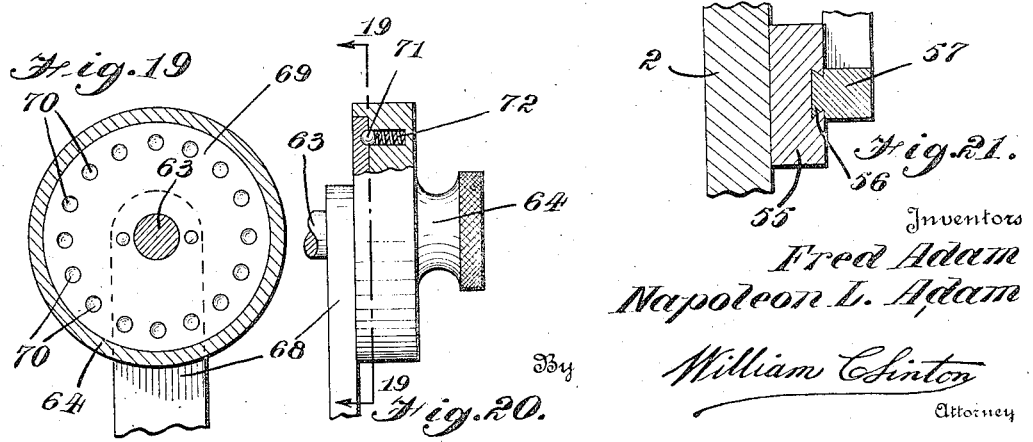

Patented May 15, 1923.

1,455,699

UNITED STATES PATENT OFFICE.

FRED ADAM, OF FORD, AND NAPOLEON L. ADAM, OF SUDBURY, ONTARIO, CANADA.

MEAT-SLICING MACHINE.

Application filed October 6, 1922. Serial No. 592,784.

*To all whom it may concern:*

Be it known that we, FRED ADAM and NAPOLEON L. ADAM, subjects of the King of Great Britain, residing at Ford and Sudbury, respectively, in the Province of Ontario, Canada, have invented certain new and useful Improvements in Meat-Slicing Machines; and we do hereby declare that the following is a full, clear, and exact description of the invention, such as will enable others skilled in the art to which it appertains to make and use the same.

The present invention relates to new and useful improvements in meat slicing machines of that type in which a reciprocating supporting table moves to and fro with relation to a blade.

The primary object of the invention is the provision of novel feeding means arranged on the reciprocating table for determining the thickness of the slice to be cut at each stroke of the table. As the supporting table slides along the face of the blade, the feeding member in which the meat is fixedly held slowly moves transversely of the sliding table and transversely of the blade, whereby a predetermined thickness of meat is presented before the blade upon each movement of the table.

The invention further contemplates a novel device for regulating the thickness of the slice to be cut at each operation. The latter device includes a pair of spaced and adjustable stop members which are engaged by a finger at each stroke of the reciprocating table, the finger imparting a predetermined extent of movement to the auxiliary meat supporting device which slides with respect to the reciprocable table.

The invention is fully disclosed in the following description and in the accompanying drawings in which:

Figure 1 is a perspective view of the device;

Figure 2 is a horizontal section, taken on the line 2—2 of Figure 3;

Figure 3 is a section on the line 3—3 of Figure 2;

Figure 4 is an end view;

Figure 5 is a section on the line 5—5 of Figure 3;

Figure 6 is an elevation of Figure 5;

Figure 7 is an elevation on the line 7—7 of Figure 3;

Figure 8 is a detail on the line 5—5 of Figure 3;

Figure 9 is a section on the line 9—9 of Figure 8;

Figure 10 is a plan view of Figure 9;

Figure 11 is a section on the line 11—11 of Figure 3;

Figure 12 is an enlarged section on the line 12—12 of Figure 2;

Figure 13 is a perspective view of the clutch lever shown in Figure 2;

Figure 14 is a section on the line 14—14 of Figure 12;

Figure 15 is a perspective view of the body cover plate;

Figure 16 is a section on the line 16—16 of Figure 7;

Figure 17 is a vertical section of the ratchet;

Figure 18 is a side view of Figure 17;

Figure 19 is a section through the regulating nut, taken on the line 19—19 of Figure 20;

Figure 20 is a side view on Figure 19, partly in section; and,

Figure 21 is a section on the line 21—21 of Figure 7.

In accompanying drawings, the numeral 1 represents a base on which the device is supported, a portion of the working mechanism being enclosed in the rectangular casing 2. A meat shelf 3 is secured to one side of the casing, and has joined thereto a plate 4 on which the motor 5 is mounted. The motor shaft 7 has a main shaft 8 joined thereto by means of a universal joint 9 and extends diagonally to the casing 2, the opposite end being supported in the bearing 10. A cross bar 11 extends through the casing 2 and carries at its external end an upright post 12 on which is mounted a bearing bracket 13. In this bracket is rotatably supported a stub shaft 14 which carries a circular knife 15 and a bevel gear 16. In the bar 11 and bracket 13 is supported an upright shaft 17 carrying at its lower end a worm gear 18 which engages the worm 20 on the main shaft 8. The portion of the upright shaft 17 which projects above the base of the bracket 13 is fitted with a bevel gear 21 which meshes with the gear 16. It will be apparent that by means of this arrangement the blade 15 is rotated from the motor through the gearing described above.

The inner end of the main shaft carries a worm 22 which drives the main gear 23 journalled in the casing. The casing is provided above this gear with a body cover plate 24 in which is formed a slot 25. The upper side edges of the casing are dovetailed as at 26 in order to slidably receive a reciprocating table or carriage 27. A stud 28 is mounted in the lower surface of the carriage and extends through the slot 25, while a similar member 29 is carried on the upper face of the main gear. These members are joined by a connecting rod 30 pivotally fastened to the free ends of each, whereby rotation of the main gear causes a sliding movement of the table 27 along the dovetail guides 26.

The main carriage 27 is provided with lateral upstanding flanges 27' on which is slidably supported a meat gripping device 31. This device consists of a base plate 32 the forward or inner end of which carries a toothed portion 33, while the body is provided with prongs 34 for gripping the lower surface of a piece of meat. A pair of upright racks 35 are fixed at the sides of the plate 32 and are engaged by a clamp member 36 slidable therealong. The lower portion of the clamp carries a toothed plate 37 which is in line with and cooperates with the toothed member 33. The interior of the clamp contains a spring member 38 which is normally distended against the upright racks and holds the clamp in downward position. In the upper surface of the clamp is fixed a handle 39 beneath which is a lifter 40 slidable through the clamp and joined to the intermediate portion of the spring 38. When it is desired to release the clamp from its locked position, the hand is laid on the handle 39 and the lifter 40 is raised by the fingers, whereby the spring disengages the racks and the clamp is free to slide therealong. A side of the meat plate 32 carries a box or block 41 in which is received the stem 42 of an elongated feed nut 43. The stem is normally urged outwardly by means of the spring 44 in the box, and the latter is closed by a cover plate 45 on which is formed a slot 46. A screw 47 passes through the slot and is engaged in the stem 42. A lever 48 pivoted to the cover at 49 is adapted to engage the screw 47 and pull the stem and nut out of engagement with the worm when the outer end of the latter has come into engagement with the nut. With the stem and nut thus withdrawn the latter can be shifted back to its original position at the inner or forward end of the worm.

The corresponding side of the reciprocating table 27 is equipped with a pair of bearings 50 in which is slidably supported a feed screw 51 which is normally in engagement with the nut 43. The outer end of the shaft of the feed screw has keyed thereto a ratchet wheel 52, as shown in Figure 7. This ratchet is engaged at opposite sides by a forked member 53 loosely mounted on the shaft and terminating in a stem 54. At the outer end wall of the casing are fixed a pair of guide members 55 which are dovetailed as at 56 for the reception of the sliding bars 57. These bars are provided each with a trip member 58 and a rack portion 59, the latter portions being parallel and in engagement with a pinion 60. A pawl 61 is slidably mounted in the stem 54 between the branches of the fork and is urged into engagement with the ratchet wheel by means of the spring 62, thus, rotation of the stem in one direction allows the pawl to pass freely over the ratchet, while rotation of the stem in the other direction turns the pawl and the feed screw 51.

As the main carriage reciprocates longitudinally of the casing 2, the finger 54 engages one of the stops 58 at the outer extremity of its stroke, that is when the piece of meat is out of the path of the knife. The stem is thus given a slight turn as the carriage continues to move in the same direction, this turn being against the ratchet 52. The worm 51 is given a corresponding turn, and since it is in engagement with the nut 43, the box 41 and meat plate 32 to which it is secured are shifted along the flanges 27'. At the other extremity of the stroke the stem is turned in the opposite direction, but the pawl passes freely over the ratchet. It will be apparent from Figure 7 that the space between the stops 58 determine the extent of rotation of the meat plate 32. In order to regulate this distance, the pinion 60 is mounted in a shaft 63 which terminates in a nut 64. A bracket 65 is mounted beneath the shaft and serves to support a hood 66 for protecting the mechanism 55—63, the stem 54 extending through the slot 67 of the hood. The bracket 65 is flanged as at 68 and supports a graduating plate 69. This plate is formed with a series of depressions 70 in which a lock ball 71 is adapted to seat. The ball is pressed against the plate by means of a spring 72 contained in the nut. As the nut is turned with relation to the plate 69, it will be locked in the desired position when the ball seats in the proper recess 70. The flange 68 and nut may be graduated to indicate the extent of adjustment. In this manner the amount of shift of the meat plate 32 at each stroke of the reciprocating table may be adjusted as desired as a result of which the thickness of the slice of meat cut is determined.

In Figures 2, 12 and 13 is shown a clutch mechanism for controlling the rotation of the main gear 23. The main shaft 8 has a sleeve 73 loosely mounted thereon, which sleeve constitutes the female member of a clutch. This member is prevented from displacement longitudinally of the shaft by means of a bushing 74 pinned to the latter. The worm 22 surrounds the sleeve 73 and is adapted to rotate therewith. When the clutch is in open position, the shaft 8 may turn, but since the latter is loose within the sleeve 73, the worm 22 cannot rotate. The shifting piece or male member 75 is slidable along the shaft, but always rotatable therewith, being held by the key 76. The member 75 is normally in engagement with the female member, being pressed by the spring 77 which surrounds the shaft and bears against the bearing 10. The bracket 78 is fixed to the cross bar 11 and has pivoted thereto the vertex of an angular clutch shifting lever 79. One end of this lever extends through the casing, while the other end is fitted with a fork 80 which engages the clutch shifter 75.

The end of the casing at which the blade is supported carries a pair of guard members 81 and 82, the former being held by bolts 83, while the latter is provided with a stem 84 which seats in a socket 85 formed on the exterior of the casing. These guards also serve to hold a supporting arm 86 extending across the blade and to the ends of which is fixed the arcuate knife edge guard 87. In this manner the entire cutting edge is protected from the exterior of the casing and cannot interfere with one who is working at the meat shelf 3. The mechanism associated with the upright shaft 17 and the knife driving shaft 14 may be protected by a housing 88, if desired.

While a specific embodiment of the invention has been illustrated and described, it is to be understood that various alterations in the details of construction may be made without departing from the spirit of the invention as indicated by the appended claims.

Having thus fully described the invention, what we claim as new and desire to protect by Letters Patent is:—

1. A meat slicer comprising a casing, a blade mounted at one end thereof, a carriage slidable on the casing along the plane of the blade, a supporting plate mounted on the carriage and slidable to and from the blade, a worm supported by the carriage, a nut fixed to the plate and engaging the worm, a ratchet at one end of the worm, said ratchet including a downwardly extending finger, a pair of stop members in the path of said finger, parallel racks connected to said stop members, and a pinion in engagement with said racks.

2. A meat slicer comprising a casing, a blade mounted at one end thereof, a carriage slidable on the casing along the plane of the blade, a supporting plate mounted on the carriage and slidable to and from the blade, a worm supported by the carriage, a nut fixed to the plate and engaging the worm, a ratchet at one end of the worm, said ratchet including a downwardly extending finger, a pair of stop members in the path of said finger, parallel racks connected to said stop members, a pinion in engagement with said racks, and means for locking said pinion in adjusted positions.

3. A meat slicer comprising a casing, a blade mounted at one end thereof, a carriage slidable on the casing along the plane of the blade, a supporting plate mounted on the carriage and slidable to and from the blade, a worm supported by the carriage, a nut fixed to the plate and engaging the worm, a ratchet at one end of the worm, said ratchet including a downwardly extending finger, a pair of stop members in the path of said finger, parallel racks connected to said stop members, a shaft extending through the casing and lying between said racks, a pinion mounted on the shaft and in engagement with said racks, a locking plate secured to the casing and surrounding the shaft, a knob fixed on the shaft and adapted for cooperation with said locking plate.

In witness whereof we have hereunto set our hands.

FRED ADAM.
NAPOLEON L. ADAM.

Witnesses:
J. O. St. Pierre,
A. P. St. Louis.